US005833408A

United States Patent [19]
Buck

[11] Patent Number: 5,833,408
[45] Date of Patent: Nov. 10, 1998

[54] RADIAL LOAD COMPENSATING APPARATUS AND METHOD FOR AXIALLY ARTICULATABLE MEMBERS

[75] Inventor: Ronald F. Buck, Warren, Mich.

[73] Assignee: Illinois Tool Works Inc., Glenview, Ill.

[21] Appl. No.: 842,160

[22] Filed: Apr. 23, 1997

[51] Int. Cl.$^6$ ................................................. B23C 9/00
[52] U.S. Cl. ........................ 409/132; 408/147; 409/231; 409/239
[58] Field of Search .................... 408/147, 124; 409/131, 132, 141, 239, 231, 233

[56] References Cited

U.S. PATENT DOCUMENTS

| | | | |
|---|---|---|---|
| 2,235,269 | 3/1941 | Walker . | |
| 3,211,025 | 10/1965 | Mottu | 409/239 |
| 3,913,192 | 10/1975 | Baumer et al. | 409/231 |
| 4,487,536 | 12/1984 | Rouzaud | 409/239 |
| 4,674,908 | 6/1987 | Kagerer | 409/231 |
| 4,679,970 | 7/1987 | Lohneis et al. . | |
| 4,793,750 | 12/1988 | Eckle | 409/231 |
| 4,930,956 | 6/1990 | Mantovani | 409/233 |
| 5,137,400 | 8/1992 | Sagara et al. | 409/231 |
| 5,482,415 | 1/1996 | Belaga et al. | 409/200 |

*Primary Examiner*—Andrea L. Pitts
*Assistant Examiner*—Christopher Kirkman
*Attorney, Agent, or Firm*—Donald J. Breh

[57] ABSTRACT

An apparatus and method for compensating a radial load between relatively axially articulatable inner and outer members, which in the exemplary embodiment are a spindle cartridge and spindle housing of a slip spindle drill assembly. The apparatus includes a strut having a curved inner end seated in a first seat on an outer surface of the inner member, and a curved outer end seated in a second seat supportably retained by a cap disposed adjustably in an opening through the outer member. The strut applies a radial force between the inner and outer members to compensate for the radial load. The strut is also pivotally disposed between the inner and outer members, whereby the strut pivots during relative axial articulation therebetween. The strut is substantially disposed radially relative to a direction of axial articulation when the inner and outer members are relatively axially articulated approximately one-half the axial articulation range.

10 Claims, 2 Drawing Sheets

RADIAL LOAD COMPENSATING APPARATUS AND METHOD FOR AXIALLY ARTICULATABLE MEMBERS

BACKGROUND OF THE INVENTION

The invention relates generally to an apparatus and method for compensating a radial load applied between axially articulatable inner and outer members, and more particularly for compensating a radial load applied to a spindle cartridge axially articulatable relative to a cartridge housing of a slip spindle drill assembly.

Radial loads applied to axially articulatable machinery members often have an adverse effect on machine operations dependant upon the axial articulation. Generally, radial loads increase friction on bearings between the axially articulatable members thereby decreasing life expectancy of the bearings and under more severe conditions obstructing free axial articulation thereof, which may be essential for certain operations, and particularly precision operations.

In the balancing of motor vehicle crankshafts, for example, unbalance is removed from partially manufactured crankshafts by drilling holes radially into counterweights on the crankshaft. An unbalance correction drill depth is computed by a balancing machine based on a nominal radius of the counterweight. The crankshaft however may or may not be machined after forging or casting, and thus the counterweight radius generally has some tolerance, which is characterized by a radius greater than the nominal radius. The unbalance correction drill depth must therefore compensate for any tolerance in crankshaft radius, otherwise the crankshaft will remain unbalanced, though less so, after the drilling operation.

To compensate for crankshaft counterweight radius tolerance, a microprocessor computes the correction drill depth for each hole during the drilling operation based further on a measure of the counterweight radius tolerance. For this purpose, the unbalance correction holes are drilled by a machine having a spindle cartridge that articulates axially relative to a spindle housing over a small range of motion, between approximately 0.015 to 0.020 inches. Such an apparatus is referred to herein as a slip spindle drill assembly, or simply drill assembly. In operation, the drill assembly is advanced on a slide toward the crankshaft counterweight to drill each hole. As the drill tip contacts the counterweight, the spindle cartridge is axially articulated, against the bias of a spring member, relative to the spindle housing. More particularly, movement of the spindle cartridge is momentarily obstructed when the drill tip initially contacts the counterweight, but the slide and spindle housing mounted thereon continue to advance toward the counterweight causing relative axial articulation between the spindle cartridge and spindle housing. The articulating spindle cartridge actuates a switch that generates an electrical signal used by the microprocessor to compute the more precise correction drill depth during the drilling operation. After the spindle cartridge is fully articulated relative to the spindle housing, the spindle cartridge continues to advance with the slide assembly toward the counterweight to complete the drilling operation.

Some slip spindle drill assemblies are rotatably driven by a tensioned belt coupled to the spindle by a pulley. The tensioned belt, however, applies a radial load, which may be as much as 100 to 200 pounds force or more, between the spindle cartridge and the spindle housing through which the spindle cartridge axially articulates. This radial load substantially increases friction in bearings between the spindle cartridge and the spindle housing thereby preventing free axial articulation of the spindle relative to the housing. The result is inconsistent and unreliable switch actuation, which results in inaccurate measures of crankshaft radius tolerance and ultimately results in crankshaft unbalance correction error. Many other applications similarly require unobstructed axial articulation between inner and outer members subject to radial loading therebetween.

In view of the discussion above among other considerations, there exists a demonstrated need for an advancement in the art of compensating a radial load applied between relatively axially articulatable first and second members.

It is therefore an object of the invention to provide a novel apparatus and method for compensating a radial load between relatively axially articulatable first and second members that overcome problems in the prior art.

It is also an object of the invention to provide a novel apparatus and method for compensating a radial load between relatively axially articulatable first and second members by applying a compensating radial force therebetween with at least one strut having an inner end seated in a first seat on an outer surface of the inner member and an outer end seated in a second seat supportably retained by the outer member.

It is another object of the invention to provide a novel apparatus and method for compensating a radial load between relatively axially articulatable first and second members by applying a compensating radial force with a strut pivotally disposed between the inner and outer members, whereby the strut pivots during relative axial articulation therebetween. And it is a related object of the invention, to dispose the strut substantially radially relative to the direction of axial articulation when the inner and outer members are axially articulated approximately one-half the axial articulation range.

It is a further object of the invention to provide a novel apparatus and method for compensating a radial load between relatively axially articulatable first and second members by applying a compensating radial force with a strut having an outer end supportably seated in a second seat formed on a recess of a cap supportably and substantially radially disposed in an opening through the outer member, whereby the cap biases the strut toward the inner member to compensate for the radial load, and according to a related object of the invention, the cap is adjustably disposed in the open end of the outer member to adjustably compensate the radial load.

It is another object of the invention to provide a novel apparatus and method for compensating a radial load between relatively axially articulatable first and second members by applying a compensating radial force with a strut pivotally disposed therebetween. The strut having a curved inner end and a curved outer end, and in one embodiment one or both inner and outer ends of the strut include a corresponding ball pivotally seated in corresponding first and second seats on or coupled to the inner and outer members. According to a related object of the invention, the curved ends of the strut or balls are Brinnelled to increase surface contact area between the inner and outer ends of the strut and the corresponding first and second seats. According to still another related object of the invention, the first and second seats include a friction reducing surface formed thereon by electro-depositing or other deposition means, and according to yet another related object of the invention, an anti-friction lubricant is applied to the first and second seats to further reduce friction.

It is still another object of the invention to provide a novel apparatus and method for compensating a radial load between relatively axially articulatable first and second members by applying a compensating radial force with a strut pivotally disposed therebetween, wherein the first member is an axially articulatable spindle cartridge with a spindle rotatably driven by a drive belt, and the second member is a relatively fixed spindle housing, whereby the radial load results from the drive belt rotatably coupled to a portion of the spindle.

These and other objects, features and advantages of the present invention will become more fully apparent upon consideration of the following Detailed Description of the Invention with the accompanying Drawings, which may be disproportionate for ease of understanding, wherein like structure and steps are referenced by corresponding numerals and indicators.

DETAILED DESCRIPTION OF THE INVENTION

Figure 1:
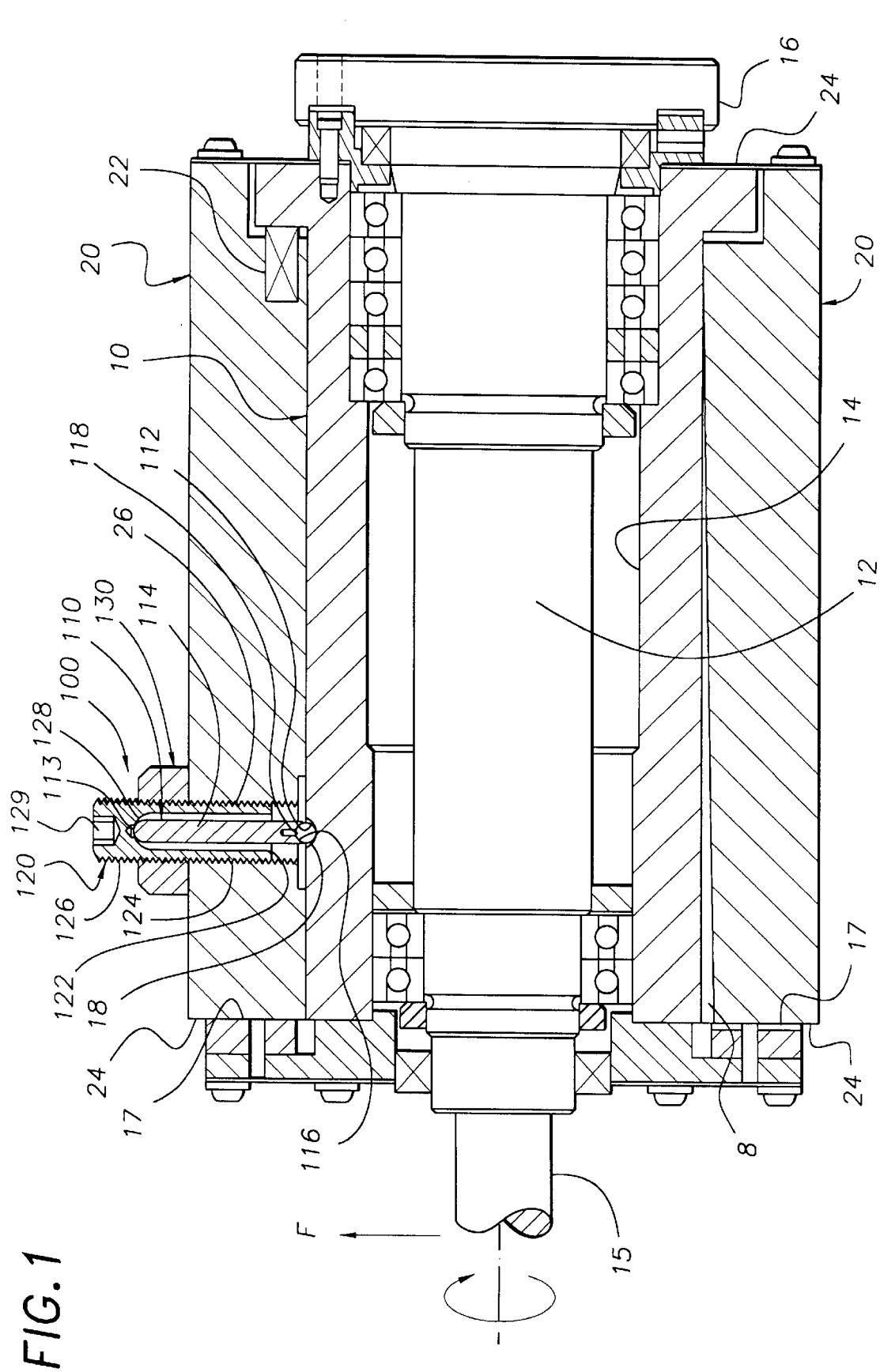
FIG. 1 is a partial sectional view of an apparatus for compensating a radial load applied between relatively axially articulatable members according to an exemplary embodiment of the invention.

The invention is drawn generally to an apparatus 100 for compensating a radial load applied between relatively axially articulatable inner and outer members, wherein the radial load is applied to either the inner member or the outer member. In the exemplary slip spindle drill assembly application of FIG. 1, the inner member is a spindle cartridge 10 having a spindle 12 rotatably coupled by bearings to an inner housing 14, wherein the radial load F is applied to an end 15 of the rotatable spindle 12 by a tensioned belt or other member not shown in the drawing. An opposing end 16 of the rotatable spindle 12 is coupleable to a chuck or other member, not shown, which may mount a drill bit. The outer member of the exemplary application, is an outer spindle housing 20, which is generally fixedly mounted on a movable slide, also not shown, for advancing the drill assembly toward and away from a crankshaft counterweight or other work piece. The inner housing 14 is rotationally fixed relative to the outer housing 20 and the rotatable spindle 12. The inner housing 14 is however axially articulatable relative to the outer housing 20, and is generally coupled thereto by anti-friction bearings, which are not shown. One or more spring members 22, shown schematically, disposed radially about the spindle cartridge 10 act between the inner housing 14 and the outer housing 20 to bias a flanged end portion 17 of the spindle cartridge 10 toward and against an abutment end member 24 of the outer housing 20. In operation, the spindle cartridge 10 is axially articulatable relative to the spindle housing 20 against the bias of spring members 22 when a load is applied axially to the end 16 of the spindle cartridge 10. In one application, the one or more spring members 22 have a total spring force of approximately 50 pounds, which is equal to the maximum axial load applied to the spindle cartridge 10.

The effect of the radial load F applied to the spindle end 15 is to urge the inner housing 14 toward the outer housing 20, particularly toward the end of the housing where the radial load F is applied as shown schematically by a gap 8. To compensate for the radial load F, the apparatus 100 includes at least one strut 110 having an inner end and an outer end disposed between the inner housing 10 and the outer housing 20. The strut inner end is seated in a first seat 18 on an outer surface of the spindle cartridge 10, and the strut outer end is seated in a second seat supportably retained by the outer housing 20. The strut 110 thus applies a radial force between the inner housing 10 and the outer housing 20 to compensate for the radial load F.

In the exemplary embodiment, the strut 110 is aligned substantially along the same radial as the radial load F to maximize the effect of the compensating force applied by the strut 110. More generally, however, the strut 110 need not be aligned along the same radial as the radial load F. According to related aspects of the invention, a plurality of at least two struts 110 are similarly arranged along different radials from a common axial origin, or along parallel radials from different axial origins, or combinations thereof to compensate for a variety of corresponding radial loading conditions. The strut is formed preferably of a material having the same or similar thermal expansion coefficient as the inner and outer housings 10 and 20 in applications where heat is generated to reduce adjustment error caused thereby.

In one embodiment, a cap 120 is supportably and substantially radially disposed in an opening 26 through the outer housing 20. The cap 120 has an open end 122 defining a recess 124 and a closed end 126, wherein the second seat 128 is disposed on the recess 124 toward the closed end 126. The strut 110 is partially disposed in the recess 124 so that the outer end of the strut 110 is seated on the second seat 128 in the recess 124, whereby the cap 120 biases the strut 110 toward the inner housing to compensate for the radial load F. According to a related aspect of the invention, the cap 120 is adjustably disposed and retained in the opening 26 through the outer housing 20, whereby the strut 110 is adjustably biased relative to the inner housing 14 by advancing and retreating the cap 120 in the opening 26 through the outer housing 20. In one embodiment, the opening 26 through the outer housing 20 and an outer surface of the cap 120 are both at least partially threaded for this purpose. The cap 120 also includes a drive means engaging recess 129 or other engageable surface like a bolt head for applying a torque to adjustably advance and retreat the cap 120 relative to the outer housing 20. The strut 110 may thus be adjustably biased between the inner and outer housing 10 and 20 to compensate any applied radial load F. A jam nut 130 threadably disposed about the threaded surface of the cap 120 may be tightened against the outer housing 20 to securely retain the cap 120 in its adjusted position.

Figure 2:
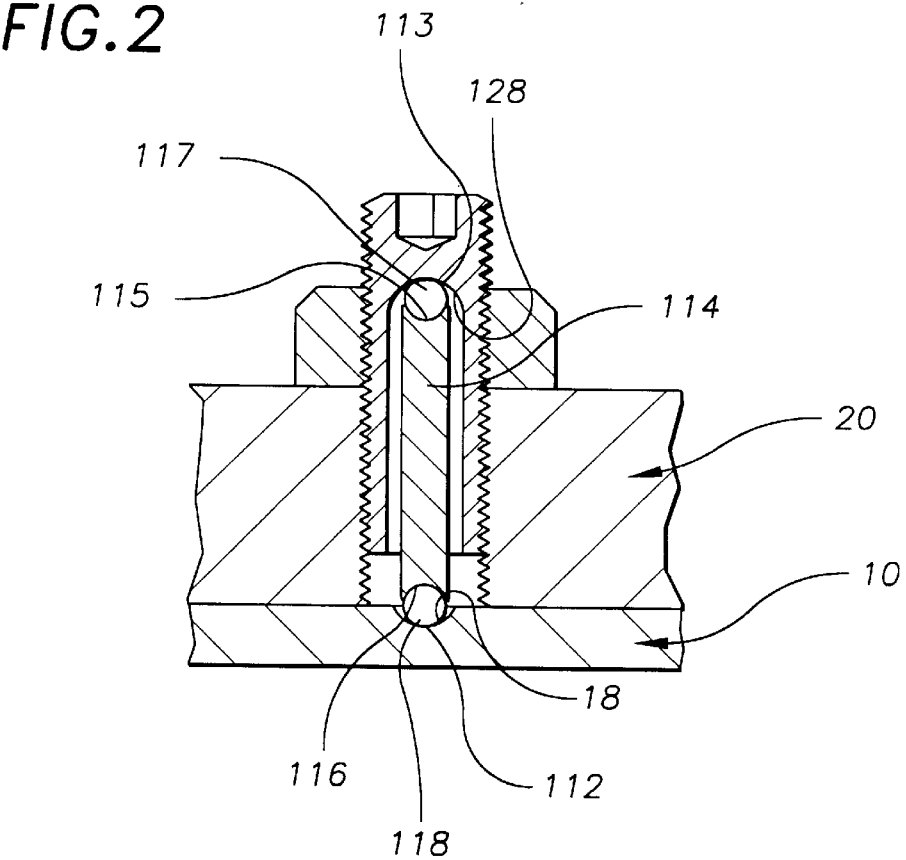
FIGS. 2 and 3 illustrate variations on the embodiments of FIG. 1.
Figure 3:
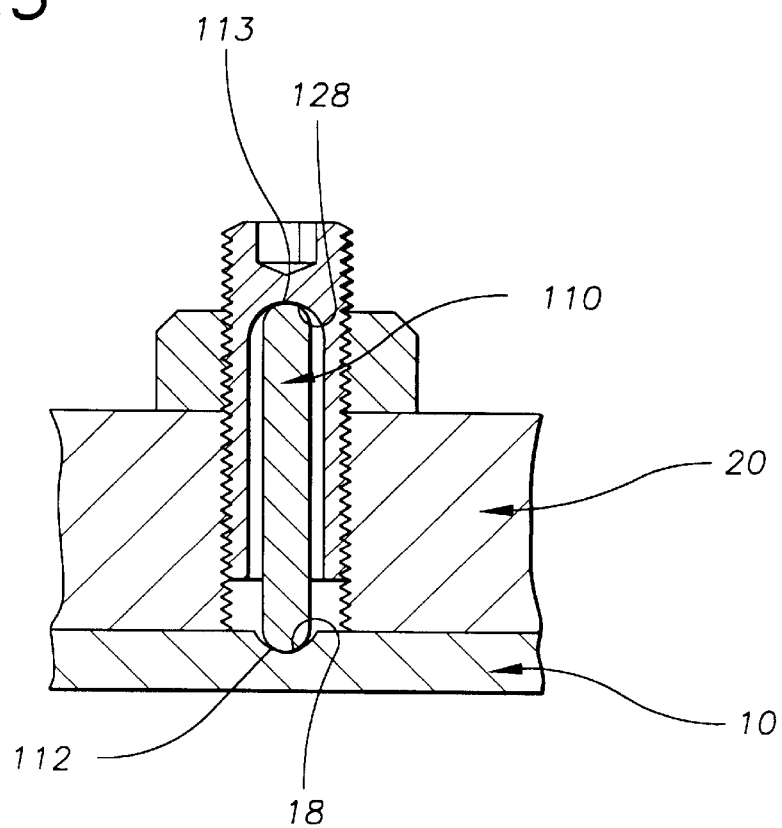

According to another aspect of the invention, illustrated in FIGS. 1–3 the strut 110 is pivotally disposed between the inner housing 10 and the outer housing 20, whereby the strut 110 pivots during relative axial articulation between the inner housing 10 and the outer housing 20. For this purpose, the inner end of the strut has a first curved surface 112 seated in the first seat 18, and the outer end of the strut has a second curved surface 113 seated in the second seat 128. According to the embodiment of FIG. 1, the strut 110 includes an intermediate body member 114 with an inner end having an inner seat 116, and a first ball 118 seated between the inner seat 116 of the intermediate body member 114 and the first seat 18 of the inner housing 10. FIG. 2 illustrates an opposing end of the intermediate body member 114 includes similarly an outer end having an outer seat 115 with a second ball 117 seated between the outer seat of the intermediate body member and the second seat 128 supportably retained by the outer housing 20.

According to yet another aspect of the invention, the strut 110 is disposed substantially radially relative to the direction of axial articulation when the inner housing 10 and outer housing 20 are relatively axially articulated approximately one-half the full range, or distance, of axial articulation therebetween. This arrangement will minimize foreshortening of the strut 110 while pivoting during relative axial articulation of the inner and outer housings 10 and 20.

According to another aspect of the invention, the inner or outer curved ends 112 and 113, or balls, of the strut may be Brinnelled into the first and second seats 112 and 128 to increase contact surface area therebetween. The Brinnelling operation may be performed by striking the installed and tightened cap 120 several times with a hammer and further tightening thereof before tightening the jam nut 130. According to another aspect of the invention, a friction reducing material, for example AMPCO No. 25 bronze, may be deposited electrically or by other means onto the first and second seats 112 and 128 to reduce friction with the inner and outer ends 112, 113 of the strut 110. Also, a lubricant, like MOTOR-KOTE No. 100, may be deposited between the strut 110 and the seats 112 and 128 to further reduce friction.

While the foregoing written description of the invention enables anyone skilled in the art to make and use what is at present considered to be the best mode of the invention, it will be appreciated and understood by anyone skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope and spirit of the appended claims.

What is claimed is:

1. An apparatus for compensating a radial load between an inner member and an outer member disposed about the inner member, the inner member and the outer member being relatively axially articulatable, the apparatus comprising:

a strut having an inner end and an outer end, the inner end of the strut seated in a first seat on an outer surface of the inner member, and the outer end of the strut seated in a second seat supportably retained by the outer member, the strut applying a radial force between the inner member and the outer member to compensate for the radial load, the strut pivotally disposed between the inner and outer members, whereby the strut pivots during relative axial articulation between the inner member and the outer member.

2. The apparatus of claim 1 further comprising:

a cap supportably and substantially radially disposed in an opening through the outer member, the cap having an open end defining a recess and a closed end, the second seat disposed on the recess toward the closed end of the cap, the strut partially disposed in the recess of the cap so that the outer end of the strut is seated in the second seat in the recess, whereby the cap biases the strut toward the inner member to compensate for the radial load.

3. The apparatus of claim 2, wherein the cap is adjustably retained in the opening through the outer member, whereby the strut is adjustably biased relative to the inner member by advancing and retreating the cap in the opening through the outer member.

4. The apparatus of claim 1, the strut having an intermediate body member with an inner end and an outer end, the inner end of the intermediate body member having an inner seat and the outer end of the intermediate body member having an outer seat, the strut having a first ball seated between the inner seat of the intermediate body member and the first seat of the inner member, and the strut having a second ball seated between the outer seat of the intermediate body member and the second seat supportably retained by the outer member.

5. The apparatus of claim 1, the inner end of the strut having a first curved surface seated in the first seat, and the outer end of the strut having a second curved surface seated in the second seat.

6. The apparatus of claim 1, the inner member and the outer member being relatively axially articulatable over a first distance, wherein the strut is disposed substantially radially relative to a direction of axial articulation when the inner member and outer member are relatively axially articulated approximately one-half the first distance.

7. The apparatus of claim 1, is a slip spindle drill assembly, wherein the inner member is an axially articulatable spindle cartridge with a spindle rotatably driven by a drive belt, and the outer member is a relatively fixed spindle housing, whereby the radial load results from the drive belt rotatably coupled to a portion of the spindle.

8. A method for compensating a radial load between an inner member and an outer member disposed about the inner member, the inner member and the outer member being relatively axially articulatable, the method comprising:

seating a curved inner end of a strut in a first seat on an outer surface of the inner member;

seating a curved outer end of the strut in a second seat supportably retained by the outer member;

applying a radial force with the strut between the inner member and the outer member to compensate for the radial load;

pivoting the strut between the inner member and the outer member during relative axial articulation between the inner member and the outer member.

9. The method of claim 8 further comprising partially disposing the strut in a recess of a cap supportably and substantially radially disposed in an opening through the outer member, and seating the outer end of the strut in the second seat on the recess of the cap to bias the strut toward the inner member to compensate for the radial load.

10. The method of claim 8 further comprising substantially radially disposing the strut relative to a direction of axial articulation when the inner member and outer member are relatively axially articulated approximately one-half a first axial articulation distance.

\* \* \* \* \*